United States Patent [19]

Stata et al.

[11] Patent Number: 4,747,430

[45] Date of Patent: May 31, 1988

[54] PROCESS AND APPARATUS FOR SLEEVE REPAIR OF PIPE LINE

[76] Inventors: Paul D. Stata, 9835 - 106 Street, Edmonton, Alberta, Canada, TSK 1C3; Harry C. Robinson, 9204 - 69 Street, Edmonton, Alberta, Canada, T6B 1V9

[21] Appl. No.: 82,918

[22] Filed: Aug. 7, 1987

Related U.S. Application Data

[63] Continuation of Ser. No. 827,636, Feb. 10, 1986, abandoned.

[51] Int. Cl.$^4$ .............................................. F16L 55/18
[52] U.S. Cl. ....................................... 138/97; 138/172; 228/44.3; 228/119; 228/212; 259/402.09; 285/286
[58] Field of Search ................... 138/97, 99, 172, 153, 138/103, 171, 110; 29/402.16, 402.01, 402.02, 402.09, 402.14, 252, 237, 526 R; 228/119, 212, 213, 44.3; 285/286; 269/91

[56] References Cited

U.S. PATENT DOCUMENTS

| | | | |
|---|---|---|---|
| 3,151,632 | 10/1964 | Risley et al. | 138/99 |
| 3,870,218 | 3/1975 | Ehle | 228/44.3 |
| 4,172,472 | 10/1979 | Parrish | 138/97 |
| 4,327,473 | 5/1982 | Somerville | 138/172 |
| 4,535,822 | 8/1985 | Rogers, Jr. | 138/99 |
| 4,644,975 | 2/1987 | Fricker | 138/172 |

FOREIGN PATENT DOCUMENTS

| | | | |
|---|---|---|---|
| 0020391 | 2/1983 | Japan | 228/212 |
| 0122196 | 7/1983 | Japan | 228/119 |

*Primary Examiner*—Henry J. Recla
*Assistant Examiner*—L. J. Peters
*Attorney, Agent, or Firm*—Ernest Peter Johnson

[57] ABSTRACT

A longitudinally split cylindrical sleeve, consisting of two half shells, is applied to an internally pressurized pipe, to reinforce a section of the pipe wall weakened by an internal or external defect. One pair of adjacent shell ends are first welded together along their length with the shells in place on the pipe in a relaxed condition. The other pair of adjacent shell ends are equipped with longitudinally extending, outwardly projecting, attached shoulder lugs. A clamp assembly is applied to the shoulder lugs to draw them together and tension the sleeve about the pipe. The clamping force applied to the shoulder lugs is monitored and terminated when the applied stress in the sleeve is approximately equal to the stress exerted on the pipe wall by the internal fluid pressure. The free ends of the shells are then welded together longitudinally while in the tensioned condition. The sleeve/pipe combination forms, in effect, a thick-walled cylinder. The stress arising from the internal fluid pressure is distributed across the cylinder. This effectively lowers the stress at the location of the defect. This, in turn, eliminates the need to apply circumferential fillet welds at the sleeve ends, since further deterioration of the defect (which would lead to leaking of the contained fluid) is arrested.

2 Claims, 4 Drawing Sheets

— HOOP GAUGE
• LONGITUDINAL GAUGE

SECTION A-A

SECTION B-B

SECTION C-C

INTERNAL GAUGE POSITIONS

SECTION A-A

SECTION B-B

SECTION C-C

EXTERNAL GAUGE POSITIONS

PROCESS AND APPARATUS FOR SLEEVE REPAIR OF PIPE LINE

This application is a continuation of application Ser. No. 827,636, filed Feb. 10, 1986, now abandoned.

FIELD OF THE INVENTION

This invention relates to repairing or reinforcing a cylindrical member, such as a high pressure steel fluid transmission pipe line, by engirdling it with a longitudinally split sleeve. The free ends of the sleeve are welded together longitudinally to form a collar that tightly enwraps said pipe.

The invention has an apparatus aspect, pertaining to the clamping means used to tension the sleeve halves or shells (already welded together along one pair of ends) and to hold the shells in that condition around the pipe while the remaining pair of free ends are welded together.

The invention further has a method aspect, relating to the combination of steps used to apply the tensioned sleeve.

And it has a product aspect, pertaining to the cylindrical member with the tensioned sleeve applied thereto and fixed therearound.

BACKGROUND OF THE INVENTION

The invention was originally conceived as a method for repairing steel pipe lines. While not limited to that application, it will now be discussed in connection with that specific application.

Oil and natural gas transmission pipe lines commonly develop defects in the pipe wall, usually in its outer surface. Predominantly, these defects take the form of corrosion pitting, which is initiated when the protective coating on the pipe is damaged and moisture comes into contact with the steel surface of the pipe. The resulting galvanic corrosion cell develops a string of rusty pits of varying depth. In addition to corrosion pitting, there can also be other defects such as dents, gouges, grooves, and cracks, which arise as a result of poor installation practises, third party acts, or metal fatigue during service.

In cases where the defect is shallow in nature, it is usual to repair the existing pipe rather than to cut out and replace the damaged segment.

The type of repair applied to a shallow defect depends on factors such as its orientation, size and depth, the pipe wall thickness, and the maximum operating pressure.

If the corrosion is not very extensive, the corrosion product is simply cleaned out and the pits are filled with hardenable mastic or epoxy, to restore the smooth pipe contour. The pipe segment is then re-wrapped with new protective coating and placed back in service.

If the defect is more serious, it is common practice to apply a full encirclement sleeve to engirdle the defect and reinforce the pipe at the locus of the defect. The present invention is concerned with this sleeve type of repair.

The sleeve repair procedure commences with some of the same steps as those used with the minor defects. That is, the protective coating is removed from the pipe segment to be repaired, the dirt and corrosion products are cleaned out of the pits, and the pits are filled with mastic or epoxy. Then a steel sleeve, split longitudinally into two half shells, is placed around the pipe over the defect. The two half shells are welded together by a longitudinal butt weld formed along one pair of adjacent ends, with the shells in a relaxed condition. A chain or cable is then tightened around the exterior of the sleeve using a ratchet tensioner, to clamp the sleeve tightly to the pipe. When the shells are clamped in this manner, a slight longitudinal gap still exists between the two remaining free ends of the sleeve. A second longitudinal butt weld is then applied along this gap, to join the free ends and convert the sleeve into a closed collar.

If there is concern that a leak will subsequently develop at the defect, it is common practice to apply a circumferential fillet weld between the pipe and the sleeve at each end of the sleeve. In this manner, a pressure tight vessel is created around the defect, to contain the leak should it develop.

To execute the circumferential fillet welds, it is necessary to heat the pipe and the sleeve to the proper welding temperature along the area to be welded. In the case of liquid transmission pipe lines, the presence of stationary or flowing liquids significantly affects the cooling rate of circumferential fillet welds. Similarly, in the case of a gas line, the segment being welded must be filled with water or the like, to avoid the possibility of an explosion. The presence of the liquid accelerates the cooling rate. When the cooling rate is too fast, the pipe steel has a tendency to develop martensitic microstructures (hard spots) along the toe of the circumferential fillet weld. This condition, known as embrittlement, particularly manifests itself in the older pipelines now undergoing repairs which are known to have a higher carbon content than modern pipe steels.

Eventually, these welds can fail catastrophically by cracking when they are subjected to severe external stresses imposed by a variety of soil conditions, such as poor backfill compaction following sleeve installations, soil movement from freeze-thaw cycles, and insufficient cover under travelled areas.

This problem with circumferential sleeve welding is such that many pipe line companies do not allow this type of sleeve repair to be made on their pipe lines, preferring to cut out and replace the damaged segment instead.

To prevent a feeling to the reader for the high incidence of these repairs, a pipe line company in Alberta recently replaced a ½ mile section of pipe that had 16 sleeve repairs in place along its length. However, in balance it needs to be said that there are other long segments of line that are free of sleeve repairs.

In summary, the repairs to be made are numerous, they have involved for decades the use of the repair sleeve procedure previously described, and the problem connected with the circumferential fillet weld has not heretofore been solved.

SUMMARY OF THE INVENTION

The present invention has the objective of providing a full encirclement sleeve that so reinforcs and joins with the wall of the cylindrical member being encircled that the two together, in effect, become a short thick-walled cylinder. The stress, arising from fluid pressure within the cylindrical member, is distributed throughout the thick-walled cylinder. As a result, the stress level associated with the defect is reduced. This reduction in stress level is sufficient so that the troublesome circumferential welds become unnecessary.

More particularly, a longitudinal (lap) weld is first applied in the usual manner along two adjacent overlapped ends of the sleeve shells. Each shell is equipped with an outwardly protruding and rigidly attached shoulder lug adjacent its remaining overlapped free end. The lug extends substantially the full width of the free end. A clamp, co-extensive with the lug is used to draw the shoulder lugs together, thereby tensioning the sleeve around the cylindrical member (usually a pipe) until the stress level in the sleeve is substantially equal to that present in the pipe wall (said stress in the wall arising from the fluid pressure within the pipe). The clamp includes means adapted to restrain the lugs from pivoting inward, due to the moment produced by the action of the clamping force—such means thus prevent binding of the shell ends on the pipe surface and within the overlapping joint. At this point, the free ends of the sleeves are welded together, to complete the installation of the sleeve.

By using a clamp whose applied force can be measured, such as a hydraulic clamp having cylinder means, it is possible to monitor the closing or tensioning force being applied to the shoulder lugs, using a gauge. The restraining means ensure that friction effects do not interfere and create differential between the force applied and the force acting to tension the sleeve. Therefore it is possible to accurately apply a circumferential tensioning stress to the sleeve that substantially satisfies the equation:

$$S = PD/2t \qquad (1)$$

where
S = the circumferential stress to be applied in pounds/inch$^2$
P = the internal pressure of the pipe in pounds/inch$^2$
D = the outer diameter of the emplaced sleeve, in inches
t = the wall thickness of the thick-walled cylinder created by the combination of the pipe and encircling sleeve, in inches.

In summary then, the sleeve is pre-tensioned before the final longitudinal weld is applied. The pre-tensioning is conducted using means whose closing force can be monitored, so that it is known when a desired stress level in the sleeve has been achieved. This stress level is selected so that, when the last weld is applied, the sleeve will thereafter in conjunction with the cylindrical member in effect form a thick-walled cylinder and share the stress acting on the cylindrical member. Preferably, the pre-tensioning stress applied satisfies equation (1). In addition, by the use of full shell width lugs and the application of closing force with clamping means that act along the full length of the lugs, the clamping force is substantially equally distributed across the full width of the sleeve.

To accomplish these ends, there is provided a novel clamp assembly for tensioning the sleeve. The clamp assembly comprises a preferably rectangular frame forming a generally central opening or window. The window is configured to permit the sleeve shoulder lugs to project therethrough. One end of the frame bears against the rear surface of the first shoulder lug. Means, such as a hydraulic cylinder or a tensioning screw, is mounted on the other end of the frame for biasing the second shoulder lug toward the first lug. The frame and biasing means thus together cooperate to fix the first lug while forcing the second lug toward it, thereby tensioning the sleeve around the pipe. The two free ends of the sleeve are left exposed by the window, so that the last weld may be applied. Restraining members are provided to connect the frame with each shoulder lug, to prevent the moment exerted by the biasing means on each lug from rotating it inwardly.

Broadly stated, the invention in one aspect comprises a process for reinforcing a cylindrical member subjected to internal pressure in use, said member having a defect in its wall, comprising: mounting a full encirclement sleeve, comprising a pair of discrete sleeve shells, around the member over the defect, each shell having an outwardly projecting lug attached thereto adjacent a first end of the shell, said lug extending substantially the full width of said first end, said first ends of the shells being overlapped, said shells being of an internal diameter such that, when their second ends are welded together and their first ends are pulled toward each other tension will be applied to the shells without the second ends of the shells coming into abutment; welding the second ends of the shells together; applying a clamping force to the lugs to draw them toward each other and tension the sleeve, said force being generally evenly applied along the length of the lugs; simultaneously restraining the lugs against inward pivoting movement to maintain the sleeve ends in substantial alignment; measuring the force being applied and stopping the drawing together of the lugs when the sleeve has been tensioned sufficiently so that the stress condition in the sleeve is substantially the same as that in the underlying portion of the cylindrical member; maintaining said sleeve in said tensioned condition and welding the first ends of the shells together; and relaxing said clamping force.

In another broad aspect, the invention comprises a process for reinforcing a high pressure fluid transmission pipe line which will be subjected to a pre-determined internal pressure in use, said line having a defect in its wall, comprising: mounting a full encirclement sleeve, comprising a pair of discrete sleeve shells, around the line over the defect, each shell having an outwardly projecting lug attached thereto adjacent a first end of the shell, said lug extending substantially the full width of said first end, said first ends of the shells being overlapped, said shells being of an internal diameter such that, when their second ends are welded together and their first ends are pulled toward each other tension will be applied to the shells without the second ends of the shells coming into abutment; welding the second ends of the shells together; applying a hydraulically induced clamping force to the lugs to draw them toward each other and tension the sleeve, said force being generally evenly applied along the length of the lugs; simultaneously restraining the lugs against inward pivoting movement to maintain the sleeve ends in alignment; measuring the force being applied as it is increased and stopping the drawing together of the lugs when the sleeve has been tensioned sufficiently so that the stress condition in the sleeve is substantially the same as that in the underlying portion of the line when the latter is subject to said pre-determined internal pressure; maintaining said sleeve in said tensioned condition and welding the first ends of the shells together; and relaxing said clamping force.

The specific best mode of the invention is now described, for exemplification, in connection with the following drawings.

DESCRIPTION OF THE PREFERRED EMBODIMENT

Figure 2:
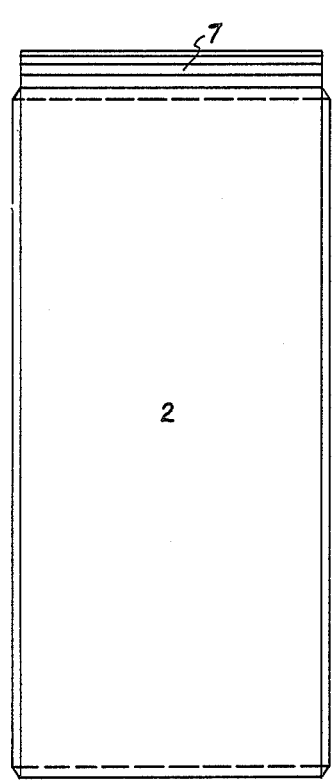
FIG. 2 is an end view of the sleeve of FIG. 1.
Figure 1:
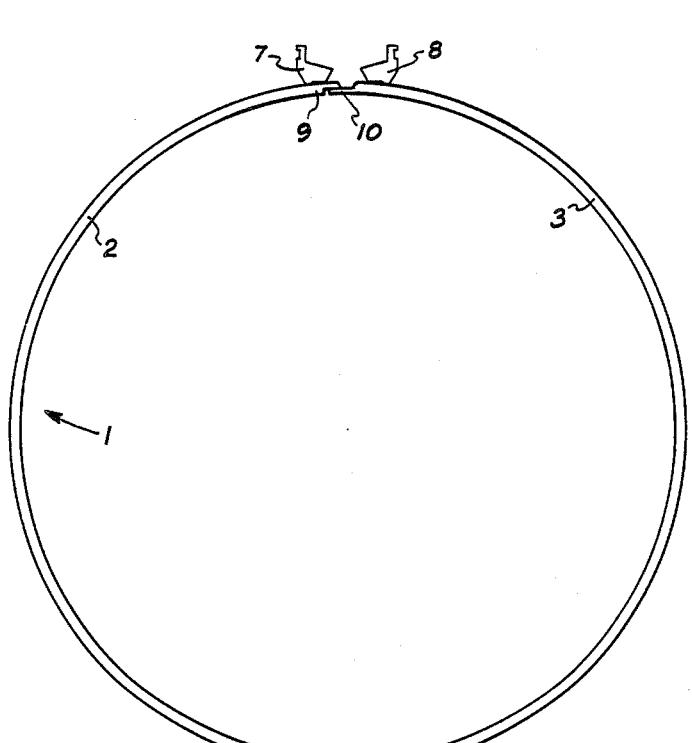
FIG. 1 is a side view of the sleeve having the shoulder lugs mounted thereon.
Figure 3:
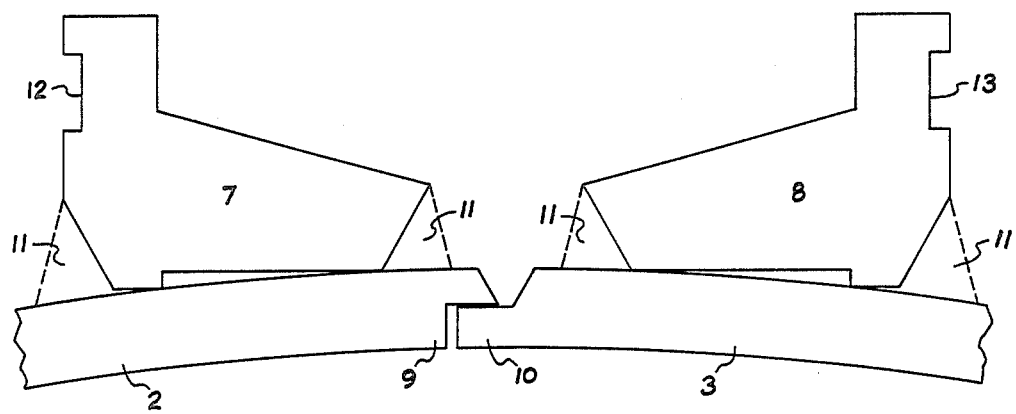
FIG. 3 is a fragmentary expanded side view showing the end portions of the sleeve with the shoulder lugs mounted thereon.
Figure 4:
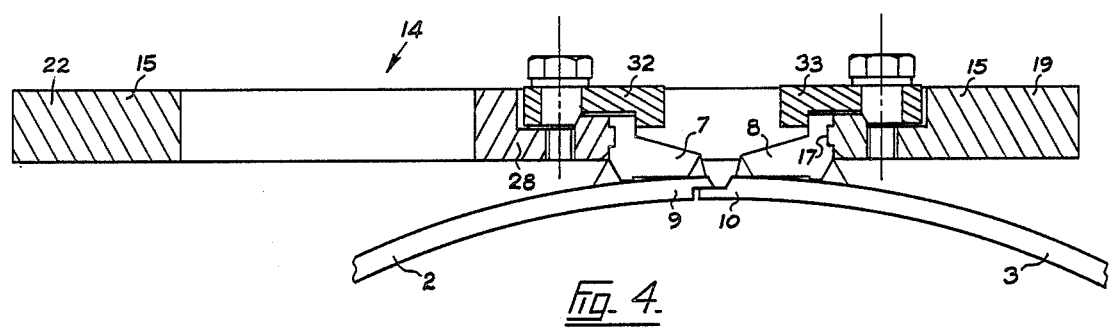
FIG. 4 is a partly sectional side view showing the end portions of the sleeve, the shoulder lugs, and the frame and hook-like restraining members of the clamp assembly.
Figure 5:
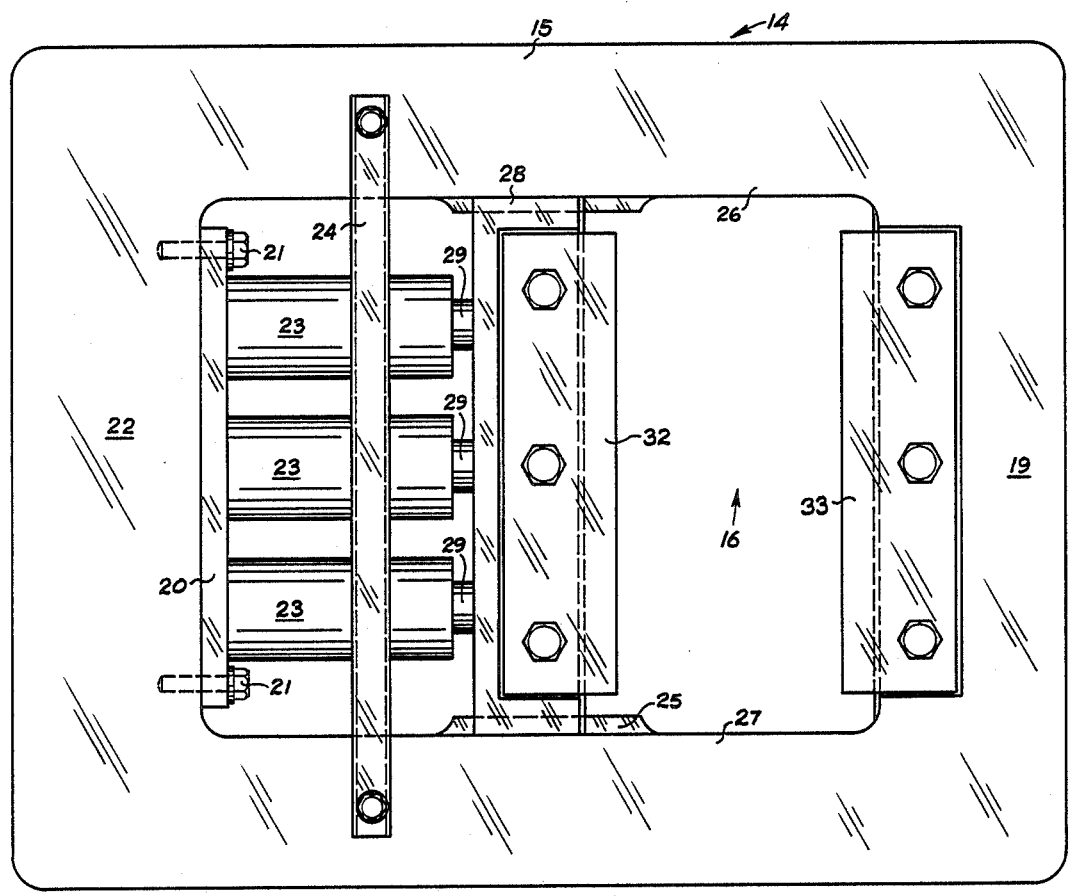
FIG. 5 is a plan view of the clamp assembly.
Figure 6:
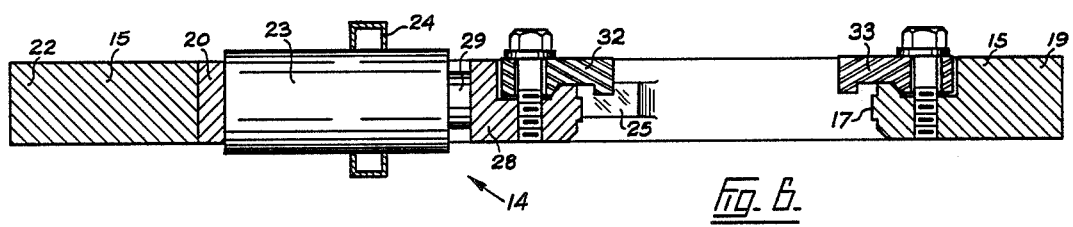
FIG. 6 is a sectional view taken along the line A—A of FIG. 5.
Figure 7:
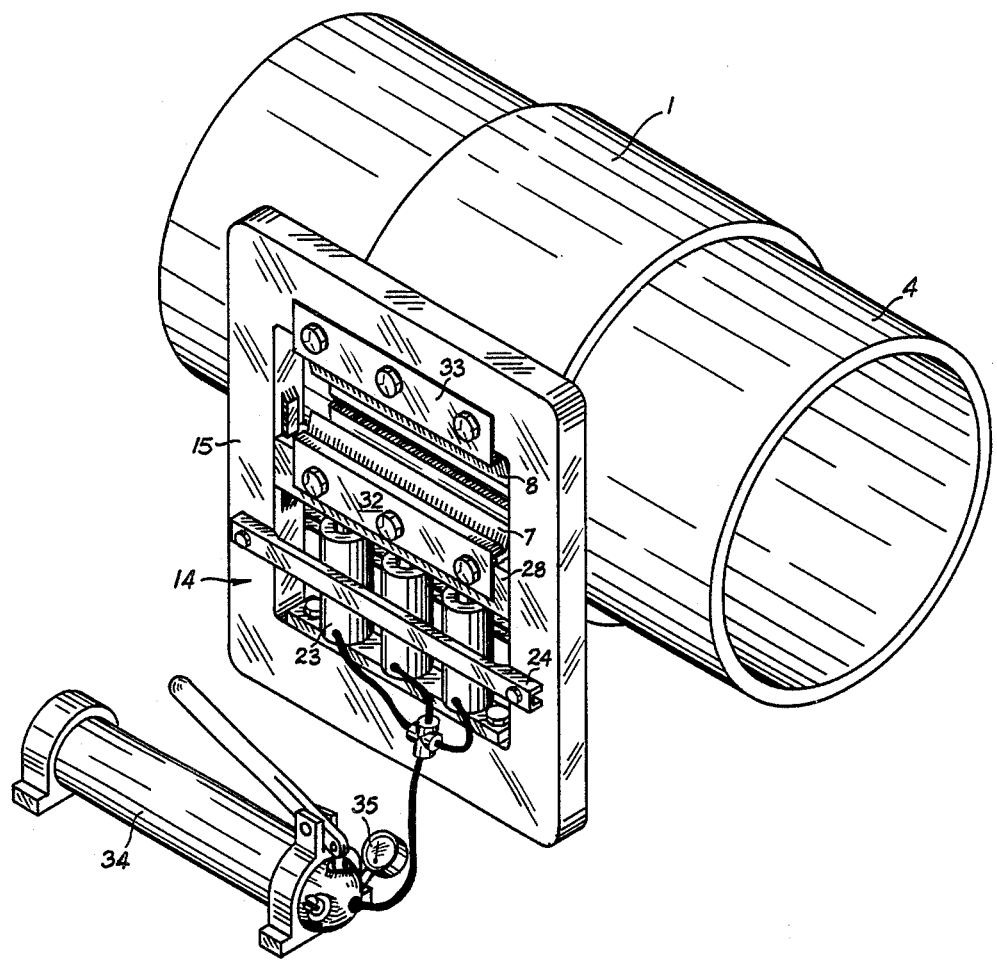
FIG. 7 is a perspective view of the clamp assembly in use.
Figure 8A:
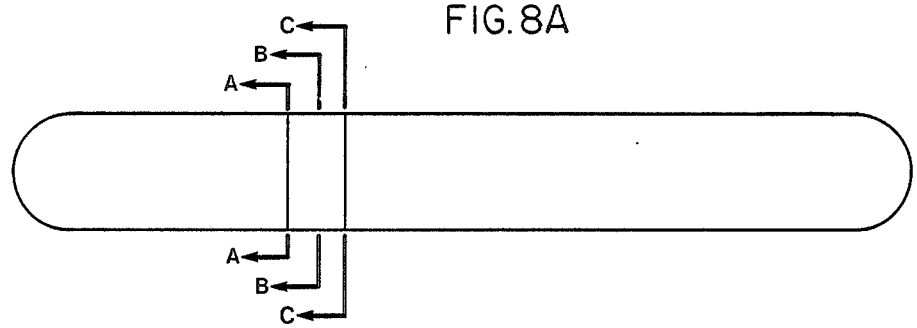
FIG. 8 is a schematic illustration of the positioning of the internal and external strain gauges on the test pipe.
Figure 8B:
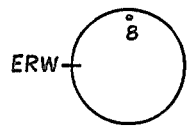
Figure 8C:
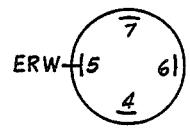
Figure 8D:
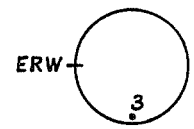
Figure 8E:
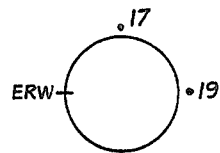
Figure 8F:
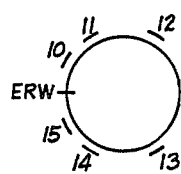
Figure 8G:
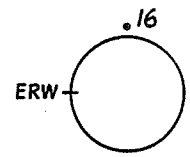

FIG. 1 shows a conventional, longitudinally split sleeve 1 comprising two semi-circular, steel shells 2, 3. The shells 2, 3 are formed at their end edges with a lap joint configuration.

The shells, 2, 3 are placed on the pipe 4 to encircle the defect to be repaired. As a first step, they are welded together longitudinally along their rear ends 5, 6 in conventional fashion.

A pair of elongate, outwardly projecting shoulder lugs 7, 8 are positioned along the front ends 9, 10 of the shells 2, 3. These shoulder lugs 7, 8 are each affixed to their respective shell, as with welds 11. Each shoulder lug 7, 8 provides a rear bearing surface 12, 13 against which the clamp assembly 14 will bear.

The clamp assembly 14 comprises a rectangular, collar-like, steel frame 15 having a rectangular opening 16 formed therein.

Along the upper end of the opening 16, the upper end portion 19 of the frame 15 provides a clamping surface 17 for locking against the rear bearing surface 13 of the shoulder member 8.

Along the lower end of the opening 16, a base plate 20 is affixed by bolts 21 to the lower end portion 22 of the frame 15. A plurality of vertically extending hydaulic cylinders 23 are supported by the base plate 20 and are held in position by straps 24.

A pair of vertically extending guide rails 25 are formed along the inner surface of the side portions 26, 27 of the frame 15. A horizontal push bar 28 is supported by the pistons 29 of the cylinders 23. The push bar 28 has milled slots in each end that engage with the guide rails 25. Thus the cylinders 23 can slide the push bar 28 up and down in the frame opening 16 along the guide rails 25, to bias the lower shoulder member 7 of the sleeve 1 toward the upper shoulder member 8.

Each of the clamping beam 17 and push bar 28 carries a restraining member 32, 33 respectively for over-arching and engaging the shoulder lug 7 or 8 associated therewith, to restrain the shoulder lug against inward rotational movement. When the clamping bar 17 and push bar 28 bear against the shoulder 8, 7, the resultant moment would tend to rotate the outer ends of the shoulder lugs downwardly and inwardly, thus applying additional load to the pipe 4; the restraining members 32, 33 function to prevent such rotation from taking place.

A hydraulic pump is used to expand the cylinders 23. A pressure gauge is attached to the pump, to provide a measure of the force being applied to the shoulder members 7, 8.

EXAMPLE

To demonstrate the invention, a repair was made on a test length of pipe having a defect formed therein.

More particularly, a 15' length of 24" diameter×0.344" thickness line pipe was provided. The pipe was formed of API Grade 5L-B steel and was closed at its ends.

The test pipe was equipped with strain gauges on its inner and outer surfaces. The locations and orientations of the gauges are indicated in FIG. 8. A description of the gauges is given in Table I.

TABLE I

| | Gauge Locations | |
|---|---|---|
| Gauge No. | Orientation | Monitors |
| 2 | Hoop | Internal surface of pipe 90 degrees from the weld seam and remote from the sleeve |
| 3 | Longitudinal | Internal pipe surface stress at the edge of the sleeve |
| 6 | Hoop | Pipe internal surface stress under the sleeve |
| 7 | Hoop | Pipe internal surface stress under the sleeve |
| 10 | Hoop | Sleeve stress about 6" from final weld |
| 11 | Hoop | Sleeve stress about 12" from final weld |
| 12 | Hoop | Sleeve stress about 24" from final weld |
| 13 | Hoop | Sleeve stress about 24" from final weld |
| 14 | Hoop | Sleeve stress about 12" from final weld |
| 15 | Hoop | Sleeve stress about 6" from final weld |
| 16 | Longitudinal | External pipe surface at edge of sleeve |
| 17 | Longitudinal | External pipe surface at edge of sleeve |
| 19 | Longitudinal | External pipe surface at edge of sleeve. |

A 12" wide×0.5" thick×24" internal diamter sleeve of API 516 Grade 70 carbon steel was used. The sleeve was in the form of 2 semi-circular shells.

The pipe was pressured internally to 500 psi, without the sleeve in place. The stress values noted are set forth in Table II.

TABLE II

Pipe Wall Stress Values Measured Prior to Sleeve Installation Pipe Pressured to 500 psi

| Gauge No. | Stress/Strain Value psi* | Zero Check Value psi** |
|---|---|---|
| 2 internal pipe wall stress - hoop | 12150 (remote from sleeve) | −240 |
| 3 internal pipe wall stress - longitudinal | 13350 (at sleeve edge) | −750 |
| 6 internal pipe wall stress - hoop | 14340 (under sleeve) | −90 |
| 7 internal pipe wall stress - hoop | 13740 (under sleeve) | −300 |

*Stress/strain values are strain gauge readings converted to stress by assuming an elastic modulus of $30 \times 10^6$ psi.
Pipe pressure was reduced to zero to check the accuracy of the strain gauges (zero check)
**The zero check readings should read between 0 and ±1000 psi to confirm that the strain gauge is functioning within the limits of accuracy.
The pipe was then repressured to 500 psi in preparation of sleeve installation.

The pipe surface over the defect was cleaned and a lubricant was applied to the sleeve area, to facilitate seating of the shells. The shells were positioned around the pipe over the defect area with the shoulder lugs adjacent each other. The sleeve gap at the shoulder lugs was maintained at 0.125" by means of a spacing plate positioned between them. The shells were then snugged down onto the pipe using a chain type ratchet tensioner and the back weld was applied. After the weld cooled, the spacing plate was removed.

The frame 15 was then fitted over the shoulder lugs 7, 8 and hydraulic pressure was applied to the push bar 28, until the cylinder pressure reached 4500 psi, to tension the sleeve 1 by biasing the lower shoulder lug 7 toward the upper shoulder lug 8, said shoulder lug 8 being locked in place by the upper end 19 of the frame. The 4500 psi value used was obtained by a calculation in accordance with equation (1), to offset the internal pressure of 500 psi which was maintained in the pipe during installation of the sleeve. This internal pressure was later increased to 1000 psi after welding was complete. The stress values recorded in connection with the test installation are set forth in Table III.

TABLE III

Pipe and Sleeve Stress Values Measured During and After Sleeve Installation

| Gauge | 500 PSI Sleeve Tensioned | 500 PSI Sleeve Installed | 1000 PSI Sleeve Installed | 0 PSI Sleeve Installed |
|---|---|---|---|---|
| 2 | 11640 | 11790 | 25800 | −3360 |
| 3 | 30750 | 8850 | 37350 | 10350 |
| 6 | −1770 | 3030 | 16890 | −6600 |
| 7 | 16140 | 5940 | 12240 | −1800 |
| 10 | 19950 | 32100 | 35250 | 22590 |
| 11 | 5760 | 14700 | 18000 | 12510 |
| 12 | 6900 | 15150 | 22110 | 10350 |
| 13 | 9150 | 15420 | 22860 | 9960 |
| 14 | 660 | 6210 | 10860 | 3510 |
| 15 | 16440 | 24000 | 26400 | 22200 |
| 16 | 7080 | 8220 | 14640 | 4140 |
| 17 | 4950 | 5160 | 10140 | 1860 |
| 19 | 4200 | 7530 | 14910 | 1110 |

Negative values denote compression.

Gauge 2 measures the internal surface tension remote from the sleeve, and is used as a reference of unrestrained pipe wall stress.

Gauge 3 measures the longitudinal pipe surface tension at the edge of the sleeve.

Gauges 6 and 7 measure the internal pipe surface tension under the sleeve.

Note: tension measured by these gauges will decrease as the pipe wall stress transfers to the sleeve due to the applied hydraulic force of the clamp. Compare the readings of gauge 2 with gauges 6 and 7 after sleeve installation at internal pipe pressures of 500 psi and 1000 psi to note the stress reduction in the pipe wall.

Gauges 10 to 15 indicate hoop tension on the outer surface of the sleeve at various distances from the clamping point and show the stress distribution around the sleeve.

Gauges 16, 17 and 19 measure longitudinal surface tension in the pipe near the edge of the sleeve and the values shown indicate the even distribution of stress to the sleeve without excessive localized stress in the pipe wall.

The scope of the invention is set forth in the claims which follow. It will be noted that the clamp assembly has been described with respect to a specific embodiment having a hydraulically driven slidable push bar acting against one shoulder lug while the other shoulder lug is held stationary by a rigid frame connected with the cylinder means. However it would be feasible to use two driven slidable push bars to act simultaneously from above and below on the shoulder lugs and other biasing means, such as a screw, could be used; the clamp assembly is to be interpreted to encompass such alternative embodiments.

The embodiments of the invention in which an exclusive property or privilege is claimed are defined as follows:

1. A process for reinforcing an internally pressurized and stressed cylindrical member, said member having a defect in its wall, comprising:

mounting a full encirclement sleeve, comprising a pair of discrete sleeve shells, around the member over the defect, each shell having first and second ends and an outwardly projecting lug attached thereto adjacent the first end of the shell, said lug extending substantially the full width of said first end, said first ends of the shells being overlapped, said shells being of an internal diameter substantially equal to the outside diameter of the cylindrical member and having a length such that, when their second ends are welded together and their first ends are pulled toward each other, tension will be applied to the shells without the first ends of the shells coming into abutment;

welding the second ends of the shells together;

applying increasing clamping force to the lugs to draw them toward each other and tension the sleeve, whereby substantially the entire internal surfaces of the shells are in contact with the outside surface of the cylindrical member, said force being generally evenly applied along the length of the lugs;

simultaneously restraining the lugs against inward pivoting movement to maintain the sleeve ends in substantial alignment;

measuring the force being applied and stopping the drawing together of the lugs when the sleeve has been tensioned a pre-determined amount and stress in the underlying portion of the cylindrical member has been reduced;

maintaining said sleeve in said tensioned condition and welding the first ends of the shells together; and relaxing said clamping force.

2. A process for reinforcing an internally pressurized and stressed high pressure fluid transmission pipe line, said line having a defect in its wall, comprising:

mounting a full encirclement sleeve, comprising a pair of discrete sleeve shells, around the pipe line over the defect, each shell having first and second ends and an outwardly projecting lug attached thereto adjacent the first end of the shell, said lug extending substantially the full width of said first end, said first ends of the shells being overlapped, said shells being of an internal diameter substantially equal to the outside diameter of the pipe line and having a length such that, when their second ends are welded together and their first ends are pulled toward each other, tension will be applied to the shells without the first ends of the shells coming into abutment;

welding the second ends of the shells together;

applying increasing hydraulically induced clamping force to the lugs to draw them toward each other and tension the sleeve, whereby substantially the entire internal surfaces of the shells are in contact with the outside surface of the pipe line, said force being generally evenly applied along the length of the lugs;

simultaneously restraining the lugs against inward pivoting movement to maintain the sleeve ends in alignment;

measuring the force being applied as it is increased and stopping the drawing together of the lugs when the sleeve has been tensioned sufficiently so that the stress condition in the sleeve is substantially the same as that in the underlying portion of the pipe wall;

maintaining said sleeve in said tensioned condition and welding the first ends of the shells together; and relaxing said clamping force.

* * * * *